(12) United States Patent
Han et al.

(10) Patent No.: US 10,878,180 B2
(45) Date of Patent: Dec. 29, 2020

(54) TEXT EDITING METHOD AND ELECTRONIC DEVICE SUPPORTING SAME

(71) Applicant: Samsung Electronics Co., Ltd., Gyeonggi-do (KR)

(72) Inventors: Wenjing Han, Beijing (CN); Xuan Zhu, Beijing (CN)

(73) Assignee: Samsung Electronics Co., Ltd

( * ) Notice: Subject to any disclaimer, the term of this patent is extended or adjusted under 35 U.S.C. 154(b) by 117 days.

(21) Appl. No.: 15/325,952

(22) PCT Filed: Jul. 24, 2015

(86) PCT No.: PCT/KR2015/007763
§ 371 (c)(1),
(2) Date: Jan. 12, 2017

(87) PCT Pub. No.: WO2016/013913
PCT Pub. Date: Jan. 28, 2016

(65) Prior Publication Data
US 2017/0161245 A1    Jun. 8, 2017

(30) Foreign Application Priority Data

Jul. 25, 2014   (CN) .......................... 2014 1 0359715
Jul. 24, 2015   (KR) ........................ 10-2015-0105219

(51) Int. Cl.
*G06F 17/00*    (2019.01)
*G06F 40/166*   (2020.01)
(Continued)

(52) U.S. Cl.
CPC ........ *G06F 40/166* (2020.01); *G06F 16/3329* (2019.01); *G06F 40/253* (2020.01);
(Continued)

(58) Field of Classification Search
None
See application file for complete search history.

(56) References Cited

U.S. PATENT DOCUMENTS 6,912,519 B2    6/2005  Shouji
7,260,773 B2 *  8/2007  Zernik ................ G06F 17/2211
                                                707/999.202
(Continued)

FOREIGN PATENT DOCUMENTS

CN    102262624    11/2011
CN    102323920    1/2012
(Continued)

OTHER PUBLICATIONS

PCT/ISA/210 Search Report issued on PCT/KR2015/007763 (pp. 3).
(Continued)

*Primary Examiner* — Mustafa A Amin
(74) *Attorney, Agent, or Firm* — The Farrell Law Firm, P.C.

(57) ABSTRACT

Embodiments relate to a method of editing text that may automatically change an expression included in input text to an appropriate expression according to a social relationship with a receiver and an electronic device supporting the method. The method may include obtaining information about at least one receiver, receiving text from a user, and changing at least a part of the text according to the obtained information about the at least one receiver.

18 Claims, 9 Drawing Sheets

(51) Int. Cl.
*H04W 4/12* (2009.01)
*G06F 16/332* (2019.01)
*G06F 40/30* (2020.01)
*G06F 40/253* (2020.01)
*G06F 40/274* (2020.01)
*H04L 12/58* (2006.01)

(52) U.S. Cl.
CPC ............ *G06F 40/274* (2020.01); *G06F 40/30* (2020.01); *H04L 51/046* (2013.01); *H04L 51/16* (2013.01); *H04W 4/12* (2013.01)

(56) References Cited

U.S. PATENT DOCUMENTS

| | | | |
|---|---|---|---|
| 7,752,034 | B2 | 7/2010 | Brockett et al. |
| 7,788,327 | B2 | 8/2010 | Naito et al. |
| 7,908,132 | B2 | 3/2011 | Brockett et al. |
| 8,140,528 | B2 | 3/2012 | Priebe |
| 8,396,494 | B2 | 3/2013 | Yamamoto |
| 8,412,512 | B1 * | 4/2013 | Wren ........................ G06F 17/28 704/3 |
| 8,479,094 | B2 | 7/2013 | Fouts |
| 8,886,735 | B1 * | 11/2014 | Liu ........................ G06Q 10/107 709/206 |
| 9,059,954 | B1 * | 6/2015 | Cohen ........................ H04L 51/14 |
| 10,050,926 | B2 * | 8/2018 | Ebersman ............... G06F 17/276 |
| 2002/0103870 | A1 * | 8/2002 | Shouji .................... G06F 40/151 709/206 |
| 2004/0158471 | A1 | 8/2004 | Davis et al. |
| 2006/0019223 | A1 * | 1/2006 | Wood ........................ G09B 7/02 434/156 |
| 2006/0069728 | A1 * | 3/2006 | McEvilly .............. G06F 40/166 709/206 |
| 2006/0167992 | A1 * | 7/2006 | Cheung ................. G06F 17/241 709/204 |
| 2008/0141106 | A1 | 6/2008 | Wolpe |
| 2008/0195379 | A1 | 8/2008 | Vanderwold et al. |
| 2008/0312927 | A1 | 12/2008 | Constantin |
| 2008/0313534 | A1 | 12/2008 | Cheung et al. |
| 2010/0082751 | A1 * | 4/2010 | Meijer .................... G06F 15/16 709/206 |
| 2012/0123766 | A1 | 5/2012 | Anisimovich et al. |
| 2012/0290299 | A1 | 11/2012 | Basson et al. |
| 2013/0144599 | A1 | 6/2013 | Davis et al. |
| 2013/0191389 | A1 * | 7/2013 | Lazarevic .......... G06K 9/00463 707/737 |
| 2013/0191739 | A1 | 7/2013 | Bank et al. |
| 2013/0268332 | A1 * | 10/2013 | Chyu .................... G06Q 30/02 705/14.17 |
| 2013/0297284 | A1 | 11/2013 | Choi et al. |
| 2014/0032683 | A1 * | 1/2014 | Maheshwari ......... H04L 51/063 709/206 |
| 2014/0120961 | A1 * | 5/2014 | Buck ....................... H04W 4/12 455/466 |
| 2015/0213008 | A1 * | 7/2015 | Orsini .................... G06F 17/28 704/2 |
| 2016/0087925 | A1 * | 3/2016 | Kalavagattu .......... H04L 51/066 709/206 |

FOREIGN PATENT DOCUMENTS

| | | |
|---|---|---|
| CN | 102737014 | 10/2012 |
| EP | 2557509 | 2/2013 |
| WO | WO 2006/026165 | 3/2006 |
| WO | WO 2010020087 | 2/2010 |

OTHER PUBLICATIONS

PCT/ISA/237 Written Opinion issued on PCT/KR2015/007763 (pp. 5).
Chinese Office Action dated Oct. 9, 2017 issued in counterpart application No. 201410359715.6, 25 pages.
European Search Report dated Dec. 14, 2017 issued in counterpart application No. 15824623.1-1871, 7 pages.

* cited by examiner

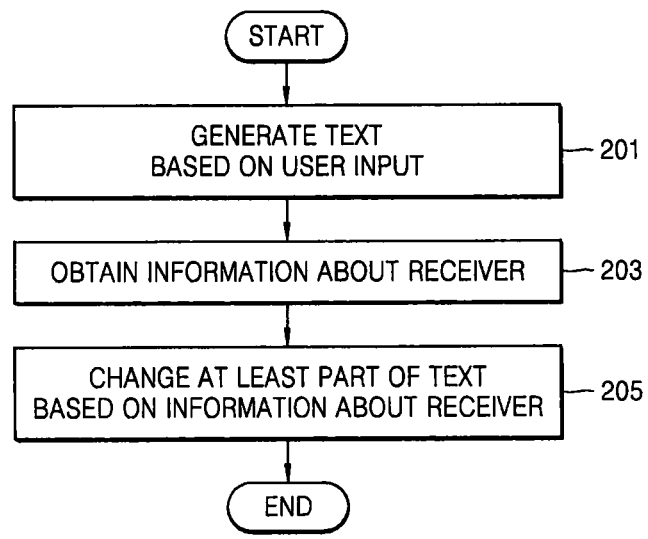
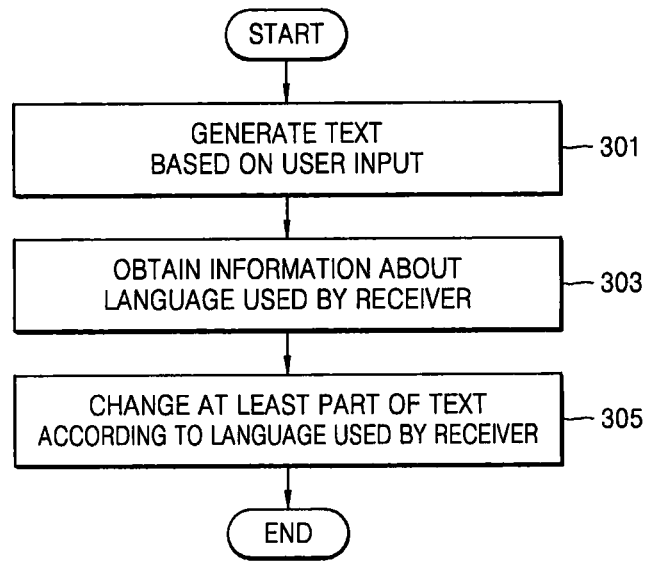

TEXT EDITING METHOD AND ELECTRONIC DEVICE SUPPORTING SAME

PRIORITY

This application is a National Phase Entry of PCT International Application No. PCT/KR2015/007763, which was filed on Jul. 24, 2015, and claims priority to Chinese Patent Application No. 201410359715.6, which was filed on Jul. 25, 2014, and Korean Patent Application No. 10-2015-0105219, which was filed on Jul. 24, 2015, the contents of each of which are incorporated herein by reference.

TECHNICAL FIELD

Embodiments relate to a method of editing text and an electronic device supporting the method.

BACKGROUND ART

As Internet technology has continuously advanced, people exchange large amounts of information through virtual platforms, for example, email instant messaging or social network sites, for daily study, work, or everyday life. The exchanged information is usually transmitted as text. Such text-based communication is important in interpersonal relations these days. Accordingly, technology for improving expressions in text is being developed.

DETAILED DESCRIPTION OF THE INVENTION

Technical Problem

According to embodiments, there may be provided a method of editing text that may automatically change an expression included in input text to an appropriate expression according to a social relationship with a receiver, and an electronic device supporting the method.

Technical Solution

A method of editing text of an electronic device may include obtaining information about at least one receiver, receiving text from a user, and changing at least a part of the text according to the obtained information about the at least one receiver.

Advantageous Effects of the Invention

According to embodiments, an expression included in input text may be automatically changed to an appropriate expression according to a social relationship with a receiver.

DESCRIPTION OF THE DRAWINGS

FIG. 2 is an overall flowchart of a method of editing text, according to an embodiment of the present invention.

FIG. 3 is a flowchart for explaining a method of editing text, according to an embodiment of the present invention.

BEST MODE

Figure 1:
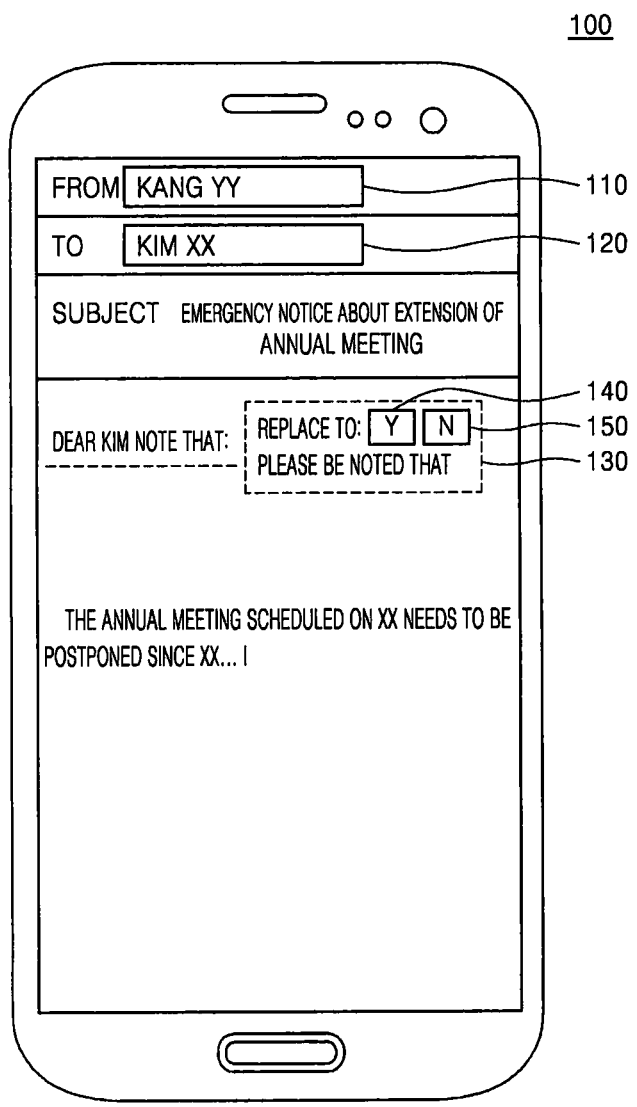
FIG. 1 is a conceptual view for explaining a method of editing text, according to an embodiment of the present invention.

A method of editing text of an electronic device according to an embodiment may include obtaining information about at least one receiver, receiving text from a user, and changing at least a part of the text according to the obtained information about the at least one receiver.

Also, the information about the at least one receiver may include information about a language used by the at least one receiver, wherein the changing of the at least part of the text includes changing the at least part of the text to text of another language according to the information about the language used by the at least one receiver.

Also, the received text may include at least two different languages, wherein the changing of the at least part of the text further includes changing the at least part of the text to text of another language according to a relative ratio of the at least two different languages.

Also, the method may further include obtaining information about a user and recognizing a social relationship between the user and the at least one receiver, wherein the changing of the at least part of the text includes changing the at least part of the text to text corresponding to the social relationship.

Also, the obtaining of the information about the at least one receiver may include obtaining information about a plurality of receivers and determining a representative receiver from among the plurality of receivers, wherein the changing of the at least part of the text includes changing the at least part of the text according to information about the representative receiver.

Also, the determining of the representative receiver may include determining the representative receiver based on at least one from among an age, a sex, a nationality, a language, a religion, a job, a location, and a position of each of the plurality of receivers.

Also, before the obtaining of the information about the at least one receiver, the method may further include collecting and storing at least one from among personal information, social relationship information, language habit information, matter of interest information, and preference information of the user, collecting and storing at least one from among personal information, social relationship information, language habit information, matter of interest information, and preference information of at least one other party with which the user has a social relationship, and collecting and storing conversation history information between the user and the at least one other party, wherein the changing of the at least part of the text includes and finding information related to the at least one receiver from among the stored pieces of information and correcting an error included in the text or changing the at least part of the text to text corresponding to the found information, based on the found information.

Also, before the obtaining of the information about the at least one receiver, the method may further include collecting storing conversation history information between the user and at least one other party with which the user has a social relationship and generating and storing language habit information of the user or language habit information of the at least one other party by analyzing the conversation history information, wherein the changing of the at least part of the text includes loading the language habit information corresponding to the user or language habit information of the at least one receiver from among the stored language habit information of the at least one other party and changing the at least part of the text to text corresponding to the loaded language habit information.

Also, before the obtaining of the information about the at least one receiver, the method may further include collecting and storing at least one from among prohibited word information corresponding to each of one or more types of social relationships, recommended conversation template information corresponding to each of the one or more types of social relationships, common sense information, and recent news information, wherein after the obtaining of the information about the at least one receiver and before the receiving of the text, the method further includes finding information corresponding to the at least one receiver from among the prohibited word information, the recommended conversation template information, the common sense information, and the recent news information and displaying the found information.

Also, before the obtaining of the information about the at least one receiver, the method may further include collecting and storing at least one from among common sense information and recent news information, wherein the changing of the at least part of the text includes detecting a part of the text having content contradicting the common sense information or the recent news information and changing the detected part of the text to text corresponding to the common sense information or the recent news information.

An electronic device according to an embodiment may include an input unit configured to receive text from a user and a controller configured to obtain information about at least one receiver and change at least a part of the text according to the obtained information about the at least one receiver.

Also, the information about the at least one receiver may include information about a language used by the at least one receiver, wherein the controller changes the at least part of the text to text of another language according to the information about the language used by the at least one receiver.

Also, the received text may include at least two different languages, wherein the controller changes the at least part of the text to text of another language according to a relative ratio of the at least two different languages included in the received text.

Also, the controller may obtain information about the user, recognize a social relationship between the user and the at least one receiver, and change the at least part of the text to text corresponding to the social relationship according to the recognized social relationship.

Also, the controller may obtain information about a plurality of receivers, determine a representative receive from among the plurality of receivers, and change the at least part of the text according to information about the representative receiver.

Also, the controller may determine the representative receiver based on at least one from among an age, a sex, a nationality, a language, a religion, a job, a location, and a position of each of the plurality of receivers.

Also, the electronic device may further include a storage unit configured to collect and store at least one from among personal information, social relationship information, language habit information, matter of interest information, and preference information of the user, collect and store at least one from among personal information, social relationship information, language habit information, matter of interest information, and preference information of at least one other party with which the user has a social relationship, and collect and store conversation history information between the user and the at least one other party, wherein the controller finds information related to the at least one receiver from among the stored pieces of information and corrects an error included in the text or changes at least part of the text to text corresponding to the found information based on the found information.

Also, the electronic device may further include a storage unit configured to collect and store conversation history information between the user and at least one other party with which the user has a social relationship and generate and store language habit information of the user or language habit information of the at least one other party by analyzing the conversation history information, wherein the controller loads the language habit information of the user or language habit information corresponding to the at least one receiver from among the stored language habit information of the at least one other party and changes the at least part of the text to text corresponding to the loaded language habit information.

Also, the electronic device may further include a storage unit configured to collect and store at least one from among prohibited word information corresponding to each of one or more types of social relationships, recommended conversation template information corresponding to each of the one or more types of social relationships, common sense information, and recent news information, wherein the controller finds information corresponding to the at least one receiver from among the prohibited word information, the recommended conversation template information, the common sense information, and the recent news information and controls the found information to be displayed on a display.

Also, the electronic device may further include a storage unit configured to collect and store at least one from among common sense information and recent news information, wherein the controller detects a part of the text having content contradicting the common sense information or the recent news information and changes the detected part of the text to text corresponding to the common sense information or the recent news information.

MODE OF THE INVENTION

The terms used in the present invention are selected from among common terms that are currently widely used in consideration of their functions in the present invention. However, the terms may be different according to an intention of one of ordinary skill in the art, a precedent, or the advent of new technology. Also, in particular cases, the terms are discretionally selected by the applicant of the present invention, and the meaning of those terms will be described in detail in the corresponding part of the detailed description. Therefore, the terms used in the present invention are not merely designations of the terms, but the terms are defined based on the meaning of the terms and content throughout the present invention.

Throughout the present application, when a part "includes" an element, it is to be understood that the part additionally includes other elements rather than excluding other elements as long as there is no particular opposing recitation. Also, the terms such as " . . . unit" or "module" used in the present application indicate a unit, which processes at least one function or motion, and the unit may be implemented by hardware or software, or by a combination of hardware and software.

The present invention will now be described more fully with reference to the accompanying drawings for one of ordinary skill in the art to be able to perform the present invention without any difficulty. The invention may, however, be embodied in many different forms and should not be construed as being limited to the embodiments set forth herein. Also, parts in the drawings unrelated to the detailed description are omitted to ensure clarity of the present invention. Like reference numerals in the drawings denote like elements.

FIG. 1 is a conceptual view for explaining a method of editing text, according to an embodiment of the present invention.

In an embodiment, examples of an electronic device 100 may include, but is not limited to, a mobile phone, a smart phone, a notebook computer, a tablet personal computer (PC), an electronic book terminal, a digital broadcasting terminal, a personal digital assistant (PDA), a portable multimedia player (PMP), a navigation system, an MP3 player, a digital camera, and a wearable device (e.g., glasses or a watch).

Hereinafter, the term 'user' used refers to a person who generates text or transmits generated text, and according to an embodiment, a 'user' is interchangeably used with the term 'sender'. The term 'receiver' refers to a person who is to receive generated or edited text.

Referring to FIG. 1, the electronic device 100 may generate (or write) text based on a user input. For example, the electronic device 100 may receive an input for writing a title or a body of the text from a user through an input unit (e.g., a keyboard). The electronic device 100 may generate the text based on the received input.

In an embodiment, the electronic device 100 may obtain information about a receiver. For example, when an email is used, the electronic device 100 may obtain a receiver's name (e.g., "Kim xx") input through a receiver input field 120. Alternatively, the electronic device 100 may obtain information about a department to which the receiver belongs and a position of the receiver as well as the receiver's name as the information about the receiver. For example, the electronic device 100 may obtain the information about the receiver such as the department of the receiver and the position of the receiver matched to the receiver's name by searching a storage unit. However, a method of obtaining the information about the receiver is not limited thereto.

In an embodiment, the electronic device 100 may change at least a part of the text based on the information about the receiver. For example, the electronic device 100 may change a language of the text, a text structure, and an expression in the text based on the information about the receiver.

For example, the electronic device 100 may obtain position information of the receiver as the information about the receiver. When it is confirmed that a position of the receiver is higher than a social position of a user, the electronic device 100 may change at least a part of the text. For example, in FIG. 1, when a position of a receiver "Kim xx" is higher than a position of a user "Kang yy" input through a user input field 110, the electronic device 100 may change "Dear Kim, note that" input to an introduction part of the text to "please note that" that has the same or similar meaning and is a more formal or polite expression.

In an embodiment, the electronic device 100 may output recommended text and a mark for selecting whether to change to the recommended text. For example, as shown in FIG. 1, the electronic device 100 may output a window 130 for outputting "please note that" as recommended text and Y and N buttons 140 and 150 for selecting whether to change to the recommended text. When the electronic device 100 receives an input that selects the "Y" button 140, the electronic device 100 may change "Dear Kim, note that" to "please note that". When the electronic device 100 receives an input that selects the "N" button 150, the electronic device 100 may maintain current text "Dear all, note Kim" without any text change.

As such, a method of editing text of the electronic device 100 according to various embodiments of the present invention may change at least a part of text (or an expression in the text) based on information about a receiver.

A method of editing text of the electronic device 100 will now be explained in more detail with reference to FIGS. 2 through 13.

FIG. 2 is an overall flowchart of a method of editing text, according to an embodiment of the present invention.

Referring to FIG. 2, in operation 201, the electronic device 100 may generate text based on a user input. Operation 201 may be performed and then operation 203 may be performed, or vice versa.

In an embodiment, the electronic device 100 may generate the text based on the user input that is input through an input unit (e.g., a keyboard or a keypad). For example, the electronic device 100 may receive letters and numbers constituting the text through the input unit from a user. In an embodiment, the electronic device 100 may generate the text by using a word processing application (e.g., Microsoft Office Word).

In another embodiment, the electronic device 100 may generate the text by retrieving pre-stored text. For example, the electronic device 100 may generate new text by retrieving a document, an email, or a text message stored in a storage unit.

In another embodiment, the electronic device 100 may generate the text by replying to or forwarding text received from an external electronic device. For example, the electronic device 100 may receive an email or a text message, and may newly generate text by replying to or forwarding the received email or text message.

In another embodiment, the electronic device 100 may generate the text through an input from the user while an instant messaging application, for example, an application that allows real-time chat with an external electronic device, is executed.

In another embodiment, the electronic device 100 may generate the text to be published (or posted) on a micro-blog or an online community.

However, embodiments are not limited thereto, and the electronic device 100 may generate the text by using various methods.

In operation 203, the electronic device 100 may receive information about a receiver. For example, when an email address of the receiver is input by the user to an email address input field, the electronic device 100 may obtain the information about the receiver corresponding to the email address based on the email address. For example, the electronic device 100 may obtain the information about the receiver mapped to the email address and stored, for example, information about a receiver's name, an age, a sex, a department, and a position.

Alternatively, when a receiver's phone number is input to a text message receiver input field, the electronic device 100 may obtain the information about the receiver based on the input receiver's phone number. For example, the electronic device 100 may obtain information about a receiver's name, an age, a sex, a department, and a position of a receiver mapped to the email address and stored by searching a phone book.

Alternatively, when a chat with the other party is performed through an instant messaging application, the electronic device 100 may obtain information about the other party in the chat, that is, a message receiver, from a server that provides an instant messaging service.

Alternatively, the electronic device 100 may obtain the information about the receiver by analyzing the generated text. For example, the electronic device 100 may obtain information about a user name and a position of the user located in an introduction part, an ending part, or a title of the text. For example, when the introduction part of the text includes "Dear Kim xx", the electronic device 100 may determine a first paragraph from among a plurality of paragraphs of the text as the introduction part of the text. Once "Dear Kim xx" is determined to be included in the introduction part of the text, the electronic device 100 may determine "Kim xx" located right behind "Dear" from among "Dear Kim xx" as a receiver. Once the receiver is determined, the electronic device 100 may obtain receiver information mapped to the receiver by searching a phone book, contact details, or the like.

Alternatively, when the text is input to a micro-blog or the like, the electronic device 100 may determine the receiver as an unspecified person.

However, a method of obtaining the information about the receiver is not limited to the above examples.

In an embodiment, the electronic device 100 may further obtain information about the user who generates or transmits the text in addition to the information about the receiver. For example, the electronic device 100 may obtain the information about the user based on a user (or sender) email address input to an email address input field. Alternatively, the electronic device 100 may obtain the information about the user based on a user name or a user phone number input to a text message sender input field. Alternatively, the electronic device 100 may obtain the information about the user from the electronic device 100 itself. For example, the electronic device 100 may obtain the information about the user from a subscriber identification module (SIM) card of the electronic device 100.

Alternatively, the electronic device 100 may further obtain the information about the user by analyzing the generated text. For example, the electronic device 100 may obtain information about a user name and a position of the user located in an introduction part, an ending part, or a title of the text. For example, when the ending part of the text includes "From Kang yy", the electronic device 100 may determine a last paragraph from among a plurality of paragraphs as the ending part of the text. When "From Kang yy" is determined to be included in the ending part of the text, the electronic device 100 may determine "Kang yy" located right behind "From" from among "From Kang yy" as a user (or a user name). Once the user is determined, the electronic device 100 may obtain user information mapped to the user by searching a phone book, contact details, or the like.

In operation 205, the electronic device 100 may change at least a part of the text based on the information about the receiver.

In an embodiment, the electronic device 100 may change a language of the text based on the information about the receiver. For example, the electronic device 100 may change a language of the generated text according to a language used by the receiver or a ratio of languages constituting the generated text.

In another embodiment, the electronic device 100 may change a paragraph structure based on the information about the receiver. For example, the electronic device 100 may check a paragraph structure of text that has been previously transmitted/received between the user and the receiver and a paragraph structure of the text that is currently generated. In an embodiment, examples of a paragraph structure of text may include a structure in which a summary, a detailed description, and a conclusion are sequentially arranged, a structure in which a detailed description and a conclusion are sequentially arranged, and a structure in which a summary and a detailed description are sequentially arranged. However, the paragraph of the text is not limited thereto. In an embodiment, the electronic device 100 may determine whether a paragraph corresponds to a summary, a detailed description, or a conclusion by checking a conjunction, a word such as an adverb, or a clause included in the paragraph. For example, when the electronic device 100 confirms that a word or a clause such as "Simply" or "In short" is included in a paragraph, for example, an introduction part of the paragraph, the electronic device 100 may determine that the paragraph corresponds to a summary. Alternatively, when the electronic device 100 confirms that a word or a clause such as "Particularly", "Specially", or "Concretely" is included in a paragraph, the electronic device 100 may determine that the paragraph corresponds to a detailed description.

Alternatively, when the electronic device 100 confirms that a word or a clause such as "In conclusion", "In short", or "Thus" is included in a paragraph, the electronic device 100 may determine that the paragraph corresponds to a conclusion. However, the technical scope of the present invention is not limited to the above examples.

In an embodiment, when the paragraph structure of the text that has been previously transmitted/received between the user and the receiver and the paragraph structure of the text that is currently generated are not the same, the electronic device 100 may change the paragraph structure of the text that is currently generated to be the same as the paragraph structure of the text that has been previously transmitted/received between the user and the receiver. For example, when a paragraph structure of email text that has been transmitted from a user A to a receiver B is a structure in which a summary is located and then a detailed description is located and a paragraph structure of the text that is currently generated is a structure in which a detailed description is located and then a summary is located, the electronic device 100 may change the paragraph structure of the text that is currently generated to a structure in which a summary is located and then a detailed description is located.

In an embodiment, the electronic device 100 may change a sentence structure of the text that is currently generated based on the information about the user. In an embodiment, the sentence structure may be a structure or an order in which words or clauses are arranged in one sentence. In an embodiment, the electronic device 100 may check a sentence structure of the text that has been previously transmitted/received between the user and the receiver. The electronic device 100 may change the sentence structure of the text according to the checked sentence structure. For example, when the text that is currently generated includes a general subject, an object, and a predicate, the electronic device 100 may confirm that the sentence structure of the text that has been previously transmitted/received between the user and the receiver is a sentence structure using clauses written according to the five W's and one H sentence writing strategy. For example, when the sentence structure of the text that is currently generated is "The meeting will take place in the first conference room at 3:00 pm today", the electronic device 100 may change the sentence structure to "For today's meeting, the time is 3:00 pm, and the location is the first conference room".

In an embodiment, the electronic device 100 may change terms, etc. of the text that is currently generated based on the information about the receiver. For example, the electronic device 100 may change words, clauses, or sentences in the text that is currently generated to words, clauses, or sentences having the same or similar meaning according to the information about the receiver. For example, when "Lots of love" is included in an ending part of the text that is currently generated and the electronic device 100 confirms that "yours lovingly" is included in an ending part of the text that has been previously received from the receiver, the electronic device 100 may change "Lots of love" to "yours lovingly". Alternatively, the electronic device 100 may change a courtesy expression of the text that is currently generated based on the information about the receiver, for example, a position of the receiver. For example, when the receiver has a higher position or older than the user, the electronic device 100 may change the text that is currently generated to a more polite expression. For example, when the text that is currently generated is "Thank you", the electronic device 100 may change the text that is currently generated to a more polite expression such as "Thank you very much for your understanding and assistance". Alternatively, when the text that is currently generated is "Sorry to bother you", the electronic device 100 may change the text to a polite expression (or a generally used polite expression) such as "Excuse me".

In an embodiment, the electronic device 100 may display the generated text so that a part that is determined to be changed is distinguished from parts that are not changed. For example, in order to distinguish a part of the text that is determined to be changed from other parts, the electronic device 100 may display the text so that a color, a thickness, a size, or a shade of the part of the text that is determined to be changed is conspicuous. In an embodiment, the electronic device 100 may display text to be obtained through change (or recommended text). For example, the electronic device 100 may display the text to be obtained through change on a separate window around the part of the text that is determined to be changed.

In another embodiment, after operation 203 in which the information about the receiver is obtained, operation 201 in which the text is generated based on the user input may be performed. Also, before operation 203 in which the information about the receiver is obtained, an operation of collecting and storing at least one from among personal information, social relationship information, language habit information, matter of interest information, or preference information of the user, an operation of collecting and storing at least one from among personal information, social relationship information, language habit information, matter of interest information, or preference information of at least one other party with which the user has a social relationship, and an operation of collecting and storing conversation history information between the user and the at least one other party may be performed.

The personal information may include at least one from among an age, a sex, a nationality, a language, a religion, a job, a location, and a position. The social relationship information may include information about the other party with which the user has a social relationship and information about a type of the social relationship. The language habit information may include information about a way of talking, an accent, and a frequently used expression of the user. The matter of interest information may include a special skill, a hobby, and a topic of interest of the user. The preference information may include information about other conversation rules, a conversation method, and a conversation policy of the user.

Also, operation 205 in which the at least part of the text is changed may include an operation of searching for and finding information related to the receiver from among the stored pieces of information and an operation of correcting an error included in the text or changing at least a part of the text to text corresponding to the found information based on the found information.

According to another embodiment, after operation 203 in which the information about the receiver is obtained, operation 201 in which the text is generated based on the user input may be performed. Also, before operation 203 in which the information about the receiver is obtained, an operation of collecting and storing conversation history information between the user and at least one other party with which the user has a social relationship and an operation of generating and storing language habit information of the user or language habit information of the at least one other party by analyzing the conversation history information may be further performed. The language habit information may include information about a way of talking, an accent, and a frequently used expression of the user.

Also, operation 205 in which the at least part of the text is changed may include an operation of loading language habit information corresponding to the receiver or language habit information of the user from among the stored language habit information of the at least one other party and an operation of changing at least a part of the text to text corresponding to the loaded language habit information.

According to another embodiment, after operation 203 in which the information about the receiver is obtained, operation 201 in which the text is generated based on the user input may be performed. Also, before operation 203 in which the information about the receiver is obtained, an operation of collecting and storing at least one from among prohibited word information corresponding to each of one or more types of social relationships, recommended conversation template information corresponding to each of the one or more social relationships, common sense information, and recent news information may be further performed.

The prohibited word information may include information about prohibited words that should not be used or are encouraged not to be used in a specific type of social relationship. For example, when the other party is his/her boss, words corresponding to honorific words may be designated as prohibited words. The recommended conversation template information may include various templates of conversations that may be made with the other party with which a specific type of social relationship is formed. The templates are displayed on a display before specific text is received from the user, and thus may help the user to more easily and conveniently input text.

Also, before operation 201 in which the text is received, an operation of searching for and finding information corresponding to the receiver from among the prohibited word information, the recommended conversation template information, the common sense information, and the recent news information and an operation of displaying the found information may be further performed.

According to another embodiment, after operation 203 in which the information about the receiver is obtained, operation 201 in which the text is generated based on the user input may be performed. Also, before operation 203 in which the information about the receiver is obtained, an operation of collecting and storing at least one from among common sense information and recent news information may be further performed.

Also, operation 205 in which the at least part of the text is changed may include an operation of detecting a part of the text having content contradicting the common sense information or the recent news information and an operation of changing the detected part of the text to text corresponding to the common sense information or the recent news information.

A method of editing text according to the information about the receiver will now be explained in more detail with reference to FIGS. 3 through 13.

FIG. 3 is a flowchart for explaining a method of editing text, according to an embodiment of the present invention.

Referring to FIG. 3, in operation 301, the electronic device 100 may generate text based on a user input. Operation 301 is the same as operation 201 of FIG. 2, and thus a detailed explanation thereof will not be given.

In operation 303, the electronic device 100 may obtain information about a language used by a receiver. For example, when information about the receiver such as an email address, a phone number, or a receiver's name of the receiver is obtained, the electronic device 100 may check information about a nationality of the receiver mapped to the information about the receiver. The electronic device 100 may obtain information about a language used by a user by checking a language used in a nation corresponding to the nationality of the receiver. Alternatively, the electronic device 100 may obtain the information about the language used by the receiver based on a language of text that has been previously transmitted/received between the user and the receiver. For example, the electronic device 100 may obtain the information about the language used by the receiver by checking a language of text having been received from the receiver to which the text is to be transmitted. However, a method of obtaining the language used by the receiver is not limited to the above example.

In an embodiment, the language used by the receiver may be a global language or a local language. The global language may be a standard language used in different nations or regions. Examples of the global language may include English, Chinese, Korean, and Japanese. The local language may be a language used in a specific region in one global language. For example, when the global language is Chinese, the local language may be Cantonese or Taiwanese.

In operation 305, the electronic device 100 may change at least a part of the text according to the language used by the receiver.

In an embodiment, the electronic device 100 may change the generated text to text of the language used by the receiver. For example, when the text is generated in English and the language used by the receiver is determined to be Chinese, the electronic device 100 may change the text generated in English to text in Chinese. In an embodiment, the electronic device 100 may change the text that is currently generated by using a language translation program to text of a language used by the user. Alternatively, when the text is generated in the local language and the language used by the receiver is determined to be the global language (or the standard language), the electronic device 100 may change the text that is generated in the local language to text of the global language.

In an embodiment, the electronic device 100 may change at least a part of the text according to a language ratio of the generated text. For example, when the text includes a plurality of languages, proportions of the plurality of languages in the generated text may be different from one another. The electronic device 100 may change the languages in the text to a language having a highest proportion from among the plurality of languages in the text. For example, when both English and Chinese are used in the text and most parts of the text are used in Chinese, the electronic device 100 may change parts of the text in English to text in Chinese.

Figure 4:
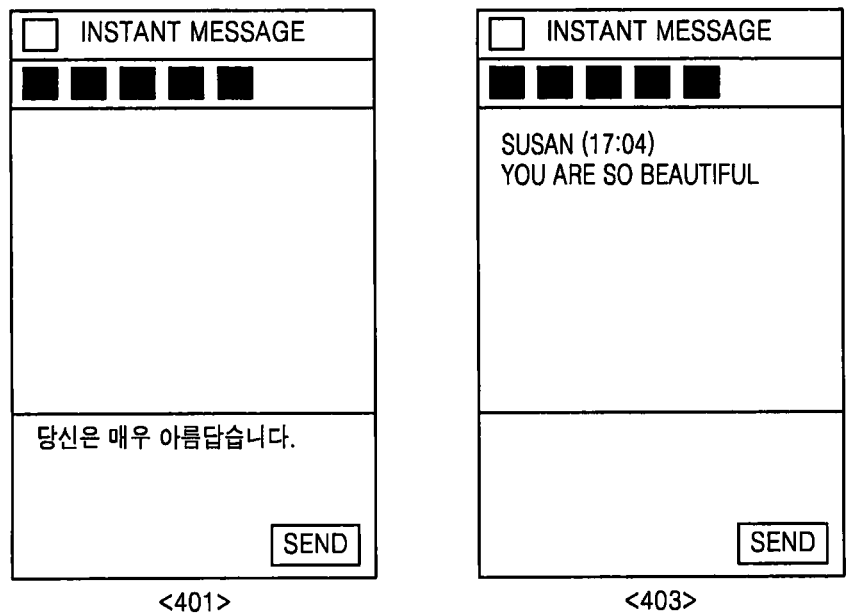
FIG. 4 is a flowchart for explaining a method of editing text according to a language used by a receiver, according to an embodiment of the present invention.

FIG. 4 is a flowchart for explaining a method of editing text according to a language used by a receiver, according to an embodiment of the present invention.

Referring to FIGS. 4, 401 and 403 denote screens on which an instant messaging application is executed. On the screen 401, when a user inputs a sentence "당신은 매우 아름답습니다" in Korean and selects a 'send' button, the electronic device 100 may obtain information about a language used by a receiver as information about the receiver. For example, the electronic device 100 may obtain the information (e.g., a receiver's name "Susan" or a receiver ID of the receiver subscribed to an instant message service) about the receiver (or the other party) subscribed to the instant message service from a server. In an embodiment, the electronic device 100 may obtain the information about the language used by the receiver based on the obtained information about the receiver. For example, the electronic device 100 may check a nationality or the like of the receiver matched to the receiver's name and may determine a language corresponding to the nationality of the receiver as the language used by the receiver. Alternatively, the electronic device 100 may obtain the information about the language used by the receiver based on a language of an instant message that has been previously transmitted/received between the user and the receiver. The electronic device 100 may check a language of a message that has been previously transmitted to the receiver and may determine the checked language of the message as the language used by the receiver.

In operation 403, when the language used by the receiver is determined to be English, the electronic device 100 may change the sentence " 당신은 매우 아름답습니다 " input in Korean to an English sentence "You are so beautiful", and may transmit the English sentence to the electronic device 100 of the receiver.

Figure 5:
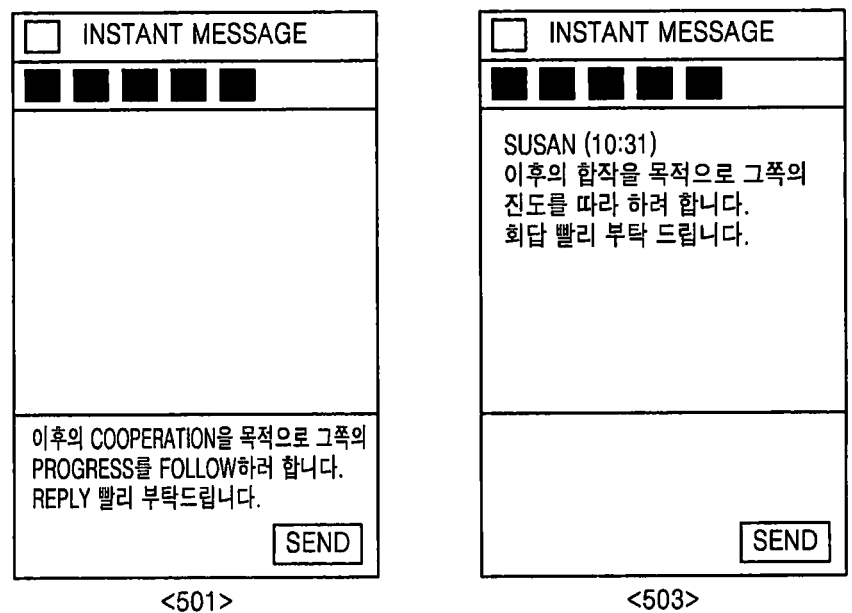
FIG. 5 is a flowchart for explaining a method of editing text according to a language ratio of text, according to an embodiment of the present invention.

FIG. 5 is a flowchart for explaining a method of editing text according to a language ratio of text, according to an embodiment of the present invention.

Referring to FIGS. 5, 501 and 503 denote screens on which an instant messaging application is executed. On the screen 501, when a user inputs " 이후의 cooperation 을 목적으로 그쪽의 progress 를 follow 하려 합니다. Reply 빨리 부탁드립니다." in Korean and English, the electronic device 100 may check proportions of Korean and English. For example, the electronic device 100 may compare the number of words input in Korean with the number of words input in English in the text and may confirm that the number of words input in Korean is greater than the number of words input in English. The electronic device 100 may change a part of the text input in English to text of Korean having a higher proportion than that of English. For example, the electronic device 100 may respectively change English words "cooperation", "progress", and "follow" to " 합작 ", " 진도 " and " 회답 ".

As shown on the screen 503, the electronic device 100 may change a part of the text input in English having a lower proportion to text of Korean having a higher proportion. The electronic device 100 may change the entire message to Korean text " 이후의 합작을 목 적으로 그쪽의 진도를 따라 하려 합니다 회답 빨리 부탁 드립니다 ".

Figure 6:
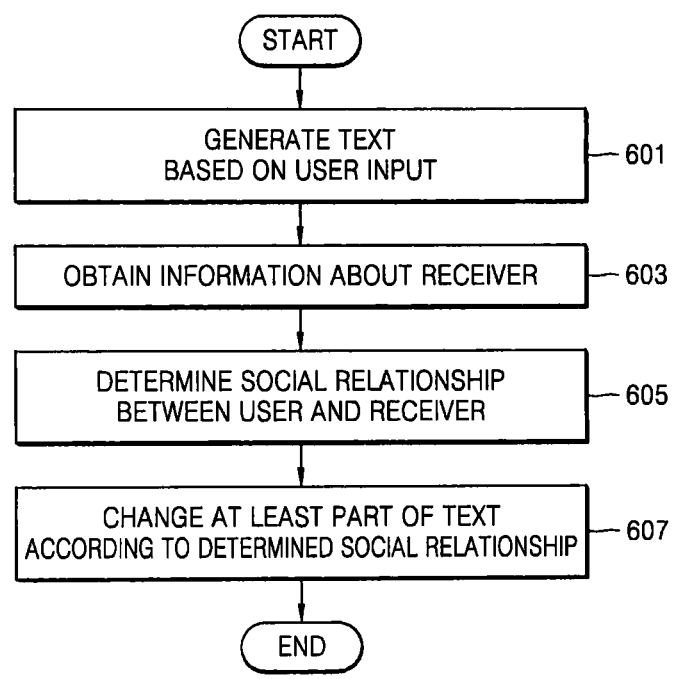
FIG. 6 is a flowchart for explaining a method of editing text, according to another embodiment of the present invention.

FIG. 6 is a flowchart for explaining a method of editing text according to another embodiment of the present invention.

Referring to FIG. 6, in operation 601, the electronic device 100 may generate text based on a user input. In operation 603, the electronic device 100 may obtain information about a receiver. Operations 601 and 603 are the same as operations 201 and 203 of FIG. 2, and thus a detailed explanation thereof will not be given.

In operation 605, the electronic device 100 may recognize a social relationship between a user and the receiver. For example, the electronic device 100 may determine that the receiver has a higher or lower position than the user according to social positions of the user and the receiver. Alternatively, the electronic device 100 may determine that the receiver is order or younger than the user according to ages of the user and the receiver.

In operation 607, the electronic device 100 may change at least a part of the text to text corresponding to the social relationship according to the social relationship between the user and the receiver. For example, when the receiver has a higher position or older than the user, the electronic device 100 may change the text that is currently generated to more polite (or formal) text. The electronic device 100 may change the text that is currently generated to text having the same or similar meaning and politeness (or formality). Alternatively, when the receiver has a lower position or younger than the user, the electronic device 100 may add an emoticon (e.g., an emoticon representing awkwardness, depression, sadness, or embarrassment) to the text. However, the embodiment is exemplary, and the technical scope of the present invention is not limited thereto.

Figure 7:
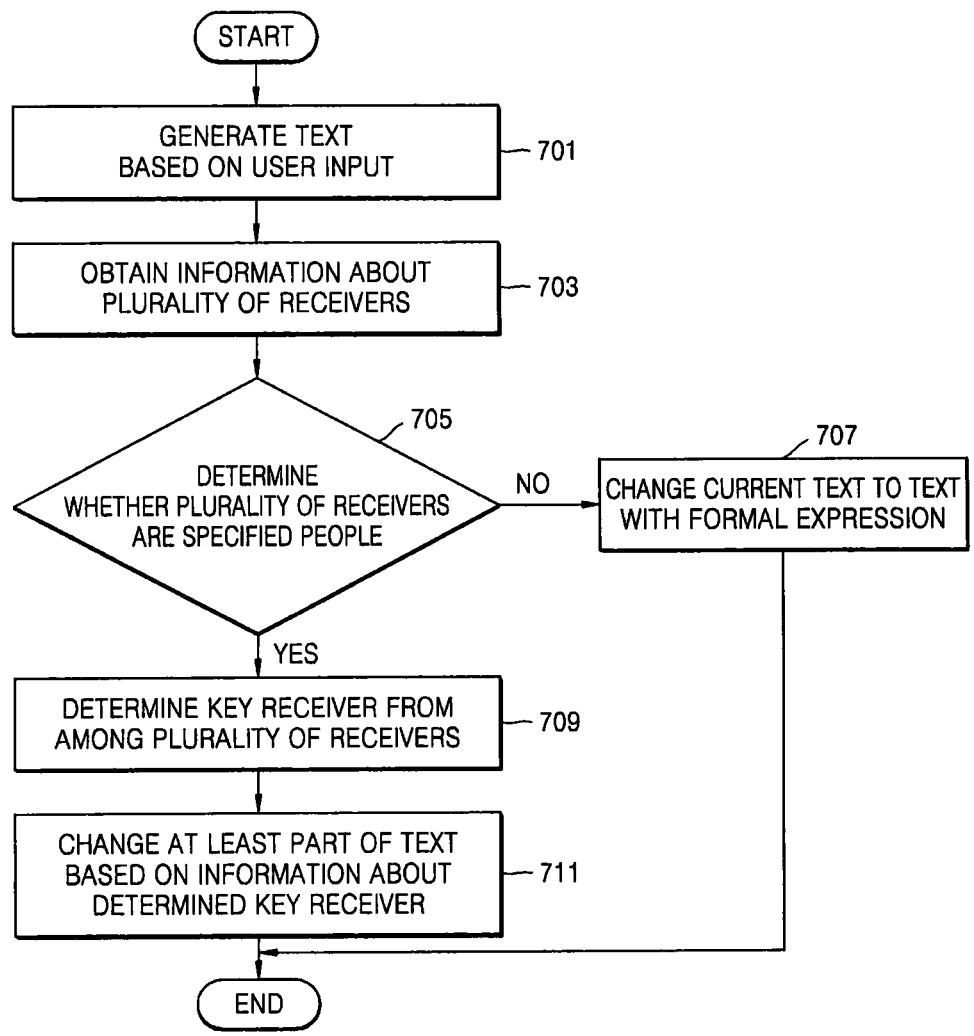
FIG. 7 is a flowchart for explaining a method of editing text, according to another embodiment of the present invention.

FIG. 7 is a flowchart for explaining a method of editing text according to another embodiment of the present invention.

Referring to FIG. 7, in operation 701, the electronic device 100 may generate text based on a user input. Operation 701 is the same as operation 201 of FIG. 2, and thus a detailed explanation thereof will not be given.

In operation 703, the electronic device 100 may obtain information about a plurality of receivers. For example, when a plurality of email addresses are input to a receiver email address input field, the electronic device 100 may obtain information about a receiver corresponding to each of the plurality of email addresses. For example, the electronic device 100 may obtain the information about the receiver mapped to the email address and stored, for example, a user name, an age, a sex, a department, and a position.

Alternatively, when a plurality of phone numbers are input to a text message receiver input field, the electronic device 100 may obtain information about a plurality of receivers corresponding to the input plurality of receiver phone numbers. Alternatively, when chat with a plurality of other parties is performed through an instant messaging application, the electronic device 100 may obtain information about a plurality of receivers from a server that provides an instant message service, or may receive information about a plurality of receiver IDs from the server and may obtain receiver information matched to the received plurality of receiver IDs and stored.

However, a method of obtaining information about a plurality of receivers is not limited thereto.

In operation 705, the electronic device 100 may determine whether the plurality of receivers are specified people. For example, when the text may be transmitted or posted without having to input a receiver, for example, when the text is generated on a blog, the electronic device 100 may determine a receiver as an unspecified person. Alternatively, when an individual person may not be designated as a receiver, for example, when a receiver is not a person but a company (or a department of a company), the electronic device 100 may determine a receiver as an unspecified person. In an embodiment, when a receiver is an individual person that may be specified, the electronic device 100 may determine a receiver as a specified person. For example, when a plurality of individual email addresses are input to an email receiver input field, the electronic device 100 may determine each of receivers corresponding to the plurality of individual email addresses as a specified person.

When it is determined in operation 705 that the plurality of receivers are not specified people (that is, the plurality of receivers are unspecified people), in operation 707, the electronic device 100 may change the text that is currently generated to text with a formal expression. For example, when a receiver is a department in a company such as 'xx administration and management department', the electronic device 100 may change the text that is currently generated to text that is formally or politely expressed. However, the embodiment is exemplary, and the scope of the present invention is not limited thereto. For example, when the text is generated on a blog and a receiver is unspecified, the electronic device 100 may add an emoticon (e.g., an emoticon representing awkwardness, depression, sadness, or embarrassment) to the text.

When it is determined in operation 705 that the plurality of receivers are specified people, in operation 709, the electronic device 100 may determine a representative receiver from among the plurality of receivers. In an embodiment, the representative receiver may be a receiver who is a standard person for determining text change from among the plurality of receivers. In an embodiment, the electronic device 100 may determine the representative receiver based on a social relationship between the plurality of receivers. In an embodiment, the electronic device 100 may recognize a social relationship between the plurality of receivers based on attribute information of the plurality of receivers. The attribute information may include information about natural attributes of each receiver and information about social attributes. The natural attributes may include an age and a sex of the receiver. The social attributes may include a nationality, a native language, a religion, a workplace, and a position of the receiver. However, embodiments are not limited thereto. In an embodiment, the electronic device 100 may obtain attribute information of each receiver by searching for information pre-stored in a storage unit, searching for text having been transmitted/received between a user and the receiver, or searching online. In an embodiment, the electronic device 100 may determine a social relationship between the receivers by comparing pieces of attribute information of the receivers. For example, the electronic device 100 may determine a receiver who is the oldest by obtaining information about ages of the receivers and comparing the ages of the receivers. The electronic device 100 may determine the receiver who is the oldest from among the receivers as a representative receiver. Alternatively, the electronic device 100 may obtain information about nationalities of the receivers. When the nationalities of the receivers are compared with one another and there is a foreigner, the electronic device 100 may determine a receiver corresponding to the foreigner as a representative receiver. Alternatively, the electronic device 100 may obtain sex information of the receivers. When there is a female receiver, the electronic device 100 may determine the female receiver as a representative receiver. However, a method of determining a representative receiver is not limited thereto.

In operation 711, the electronic device 100 may change at least a part of the text based on information about the determined representative receiver. For example, when the text that is currently generated is text expressed in Chinese and a language used by the representative receiver is English, the electronic device 100 may change the text expressed in Chinese to text of English. Alternatively, when it is determined that a social position of the representative receiver is higher than that of the user, the electronic device 100 may change an expression of the text to a polite expression (or a formal expression).

Figure 8:
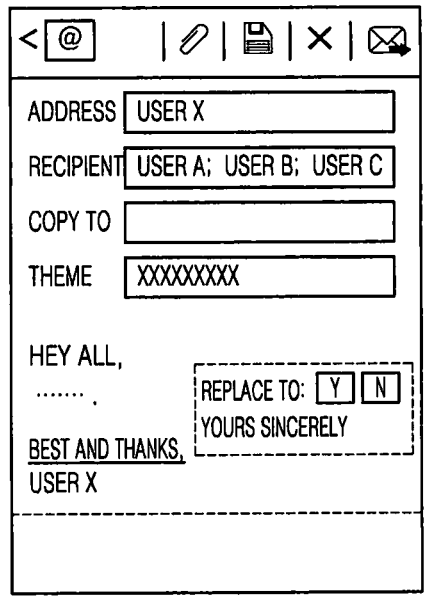
FIG. 8 is an exemplary view for explaining a method of editing text, according to another embodiment of the present invention.

FIG. 8 is an exemplary view for explaining a method of editing text according to another embodiment of the present invention.

Referring to FIG. 8, 801 denotes a screen showing text that is generated in an email. The electronic device 100 may obtain information about a user "User X" input through a sender input field and may obtain information about a plurality of receivers "User A", "User B", and "User C" input through a receiver input field.

In an embodiment, the electronic device 100 may obtain attribute information of each of the plurality of receivers "User A", "User B", and "User C". For example, as shown on 803, attribute information about a name, an age, a nationality, an institute, a position, and a religion of each of the plurality of receivers "User A", "User B", and "User C" may be obtained. In an embodiment, the electronic device 100 may confirm that each of the plurality of receivers "User A", "User B", and "User C" is a specified person and may determine the receivers as specified people (or specified receivers).

In an embodiment, the electronic device 100 may determine a representative receiver from among the plurality of receivers "User A", "User B", and "User C". For example, the electronic device 100 may determine a representative receiver based on the obtained attribute information. For example, on 803, the electronic device 100 may confirm that the receivers "User A" and "User B" are teachers and the receiver "User C" is a student. The electronic device 100 may confirm that the receiver "User A" is older than the receiver "User B". The electronic device 100 may determine the receiver "User A" as a representative receiver based on positions and ages as attribute information. Alternatively, the electronic device 100 may confirm that the receiver "User A" is a male and the receiver "User B" is a female. For example, when a higher priority is allocated to a female than a male in a setting condition for determining a representative receiver, the electronic device 100 may determine the receiver "User B" as a representative receiver based on positions and sexes. However, the embodiment is exemplary and the technical scope of the present invention is not limited thereto. For example, when a higher priority is allocated to a religion in a setting condition for determining a representative receiver, the electronic device 100 may determine the receiver "User A" as a key user.

In an embodiment, once the representative receiver is determined from among the plurality of receivers "User A", "User B", and "User C", the electronic device 100 may change at least a part of the text based on information about the representative receiver. For example, when the receiver "User A" is determined as a representative receiver, the electronic device 100 may change at least a part of the text based on text having been transmitted/received between the user "User X" and the representative receiver "User A". For example, the electronic device 100 may change "Best and thanks" generated in an ending part of the text to "Yours sincerely". In an embodiment, the electronic device 100 may output "Yours Sincerely" as recommended text and a button for selecting whether to change to the recommend text.

Figure 9:
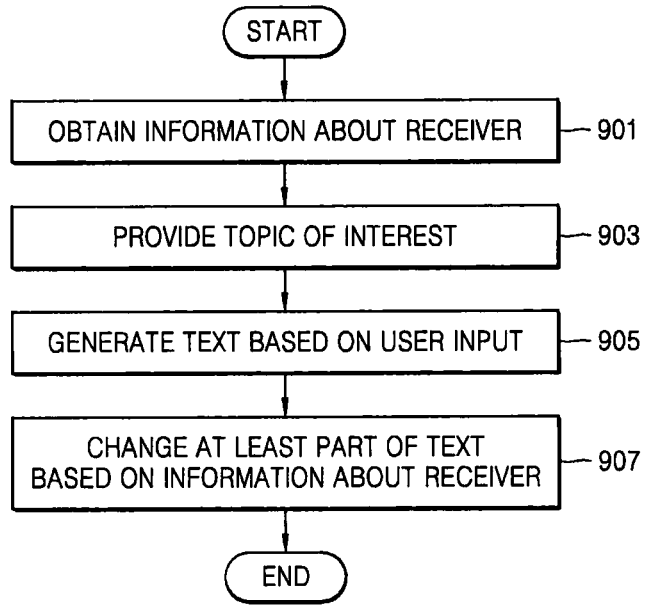
FIG. 9 is a flowchart for explaining a method of providing a topic of interest based on information about a receiver, according to an embodiment of the present invention.

FIG. 9 is a flowchart for explaining a method of providing a topic of interest based on information about a receiver, according to an embodiment of the present invention.

Referring to FIG. 9, in operation 901, the electronic device 100 may obtain information about a receiver. Operation 901 is the same as operation 203 of FIG. 2, and thus a detailed explanation thereof will not be given.

In operation 903, the electronic device 100 may provide a topic of interest. In an embodiment, the topic of interest may be a common topic of interest between a user and the receiver. In an embodiment, the electronic device 100 may determine the topic of interest based on text having been transmitted/received between the user and the receiver.

For example, the electronic device 100 may determine a word or the like generated a predetermined number of times or more in a title and a body of the text having been transmitted/received between the user and the receiver as the topic of interest. For example, when a word "travel" is generated a predetermined number of times or more in the text having been transmitted/received between the user and the receiver, the electronic device 100 may determine the word "travel" as the topic of interest. Once the electronic device 100 determines "travel" as the topic of interest, the electronic device 100 may provide information related to 'travel', for example, tourist attractions, traffic conditions, and lodging information.

Alternatively, the electronic device 100 may provide a hot topic as the topic of interest. For example, the electronic device 100 may obtain information about the hot topic from websites. For example, during the World Cup, the electronic device 100 may determine the World Cup as the topic of interest and may provide the description of game schedules and players related to the World Cup.

In operation 905, the electronic device 100 may generate text based on a user input. In operation 907, the electronic device 100 may change at least a part of the text based on the information about the receiver. Operations 905 and 907 are the same as operations 201 and 205 of FIG. 2, and thus a detailed explanation thereof will not be given.

Figure 10:
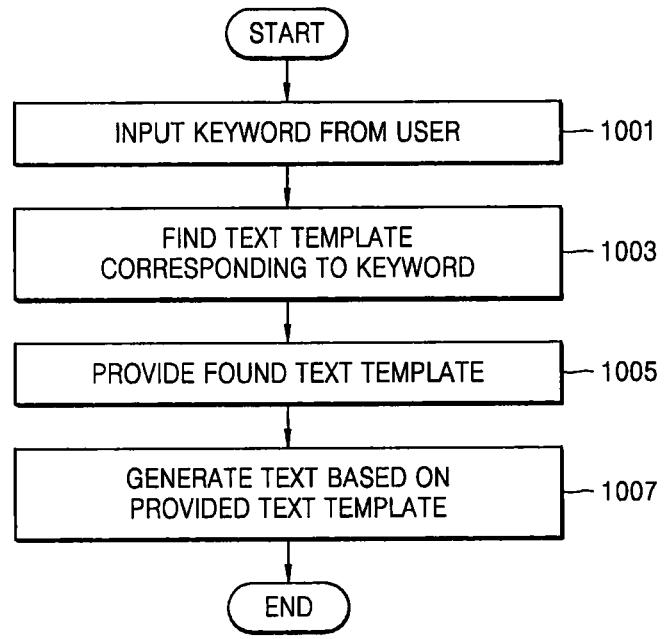
FIG. 10 is a flowchart for explaining a method of providing a text template based on information about a receiver, according to an embodiment of the present invention.

FIG. 10 is a flowchart for explaining a method of providing a text template based on information about a receiver, according to an embodiment of the present invention.

Referring to FIG. 10, in operation 1001, the electronic device 100 may receive a keyword from a user. In an embodiment, the keyword may be a word or the like for determining a body of text.

In operation 1003, the electronic device 100 may search for a text template corresponding to the keyword. In an embodiment, the text template may be a text frame generated based on the keyword. For example, when the user inputs "meeting" as the keyword in order to notify a meeting, the electronic device 100 may search for a text template related to "meeting". For example, the electronic device 100 may search for and find a text template in which text except information about a time and a location, for example, "For meeting, the time is ( ) and the location is ( )", is pre-written.

In operation 1005, the electronic device 100 may provide the found text template. For example, the electronic device 100 may display the text template that is editable.

In operation 1007, the electronic device 100 may generate text based on the provided text template. For example, the electronic device 100 may generate the text by receiving an input that selects the text template from the user. In an embodiment, the electronic device 100 may complete the text by receiving an input related to a blank (in brackets) of the generated text from the user.

Figure 11:
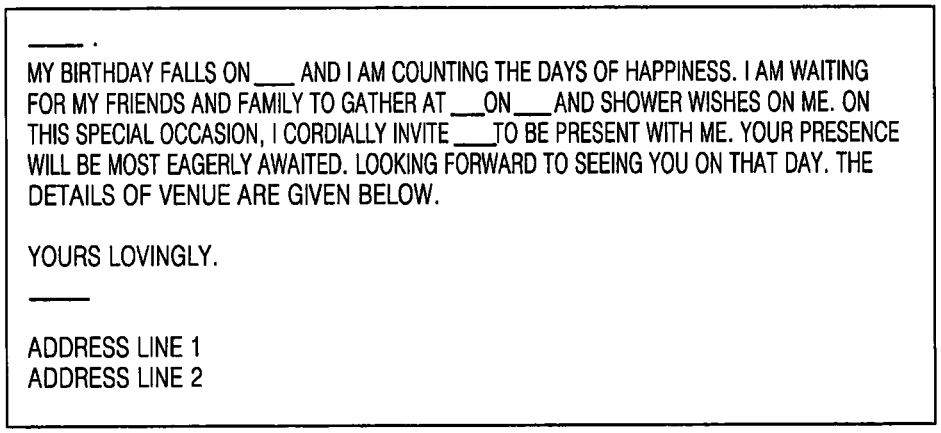
FIG. 11 is an exemplary view for explaining a method of providing a text template based on information about a receiver, according to an embodiment of the present invention.

FIG. 11 is an exemplary view for explaining a method of providing a text template based on information about a receiver, according to an embodiment of the present invention.

Referring to FIG. 11, the electronic device 100 may receive a keyword "English birthday party invitation" from a user. The electronic device 100 may obtain a text template corresponding to "English birthday party invitation" by searching a storage unit based on the input keyword.

In an embodiment, as shown in FIG. 11, the electronic device 100 may provide a text template for birthday party invitation, excluding input fields for a time, a place, and an invitation list.

Figure 12:
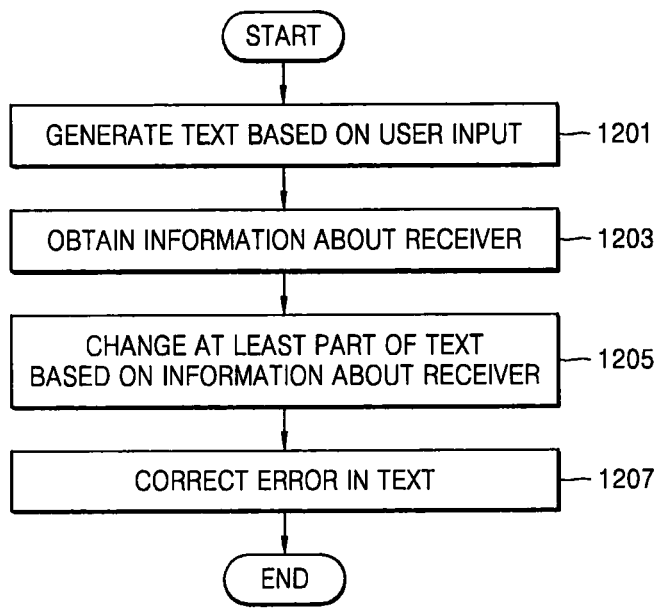
FIG. 12 is a flowchart for explaining a method of correcting an error in text, according to an embodiment of the present invention.

FIG. 12 is a flowchart for explaining a method of correcting an error in text, according to an embodiment of the present invention.

Referring to FIG. 12, in operation 1201, the electronic device 100 may generate text based on a user input. In operation 1203, the electronic device 100 may obtain information about a receiver. In operation 1205, the electronic device 100 may change at least a part of the text based on the information about the receiver. Operations 1201, 1203, and 1205 are respectively the same as operations 201, 203, and 205 of FIG. 2, and thus a detailed explanation thereof will not be given.

In operation 1207, the electronic device 100 may correct an error in the text.

In an embodiment, the electronic device 100 may correct a logical error, a general knowledge error, and an obvious spelling error in the text.

For example, when a date input to the text that is currently generated is Jul. 9, 2014 and a current date is Jul. 10, 2014 and thus there is a logical error, the electronic device 100 may output a notice indicating the logical error.

Alternatively, when a general knowledge error such as "The capital of Australia is Sydney" is included in the text that is currently generated, the electronic device 100 may correct "Sydney" to "Canberra".

Alternatively, when an obvious spelling error such as "Lots of lave" is included in the text that is currently generated, the electronic device 100 may correct "Lots of lave" to "Lots of love".

Figure 13:
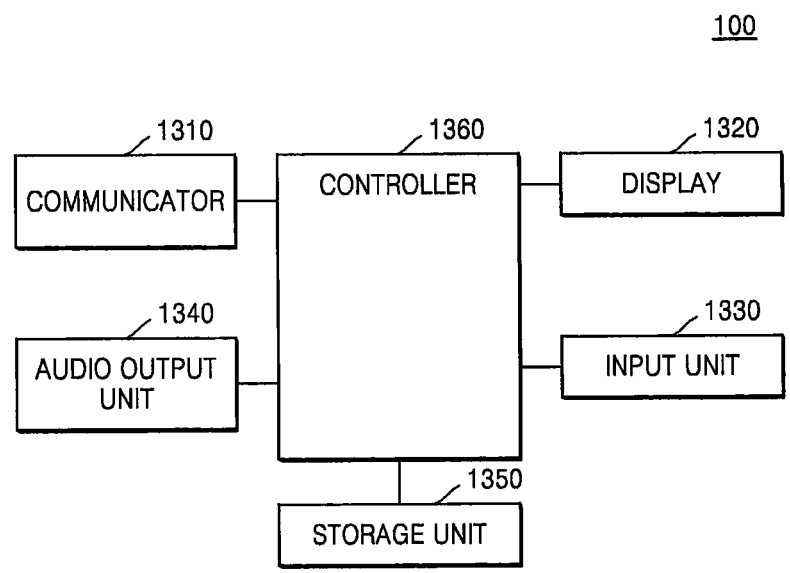
FIG. 13 is a block diagram of an electronic device for editing text, according to an embodiment of the present invention.

FIG. 13 is a block diagram of the electronic device 100 for editing text, according to an embodiment of the present invention.

Referring to FIG. 13, the electronic device 100 may include a communicator 1310, a display 1320, an input unit 1330, an audio output unit 1340, a storage unit 1350, and a controller 1360.

In an embodiment, the communicator 1310 may connect the electronic device 100 to an external device (e.g., a server that provides an instant messaging service) under the control of the controller 1360. The controller 1360 may transmit generated text to the external device connected through the communicator 1310 or may receive text from the external device. For example, the controller 1360 may transmit an email, a text message, etc. to the external device through the communicator 1310. In an embodiment, examples of the communicator 1310 may include, but not limited to, a Bluetooth low energy (BLE) communicator, a near-field communicator, a wireless local area network (WLAN) communicator, a ZigBee communicator, an infrared data association (IrDA) communicator, a Wi-Fi Direct (WFD) communicator, an ultra-wideband (UWB) communicator, and an ANT+ communicator.

In an embodiment, the display 1320 may display data on a screen under the control of the controller 1360. For example, when the controller 1360 processes (e.g., decodes) data and stores the data in a buffer, the display 1320 may change the data stored in the buffer to an analog signal and may display the analog signal on the screen. The display 1320 may display various screens, for example, a lock screen, a home screen, an application execution screen, a menu screen, a keypad screen, a message writing screen, and an Internet screen, according to the use of the electronic device 100 under the control of the controller 1360.

In an embodiment, examples of the display 1320 may include a liquid crystal display (LCD), an active-matrix organic light-emitting diode (AMOLED), a passive-matrix organic light-emitting diode (PMOLED), a flexible display, and a transparent display.

In an embodiment, the display 1320 may display generated text or text obtained by changing at least a part of the generated text under the control of the controller 1360. In another embodiment, the display 1320 may display recommended text and a mark for selecting whether to change to the recommended text under the control of the controller 1360. In another embodiment, the display 1320 may display a text template under the control of the controller 1360.

In an embodiment, the input unit 1330 may include a touch panel and a key input unit. In an embodiment, the touch panel may generate a touch event in response to a contact with a user's finger, and may transmit the generated touch event to the controller 1360. Coordinates included in a touch region of the touch panel, that is, a region touched by the user's finger or a pen, may be transmitted to the controller 1360, and the controller 1360 may determine at least one from among the coordinates included in the touch region as a touch point.

In an embodiment, the touch panel may receive letters and numbers constituting text from the user. In another embodiment, the touch panel may receive an input for transmitting the generated text or text obtained by changing at least a part of the generated text to a receiver from the user.

In an embodiment, the key input unit may include a plurality of keys for receiving number or letter information and setting various functions. The keys may include a menu recall key, a screen on/off key, a power on/off key, and a volume control key. The key input unit generates a key event related to a function control of the electronic device 100 and user setting and transmits the key event to the controller 1360. The keys of the key input unit may be referred to as hard keys and virtual keys displayed on the display 1320 may be referred to as soft keys.

In an embodiment, the audio output unit 1340 may output an audio (e.g., a voice or a sound) input through the communicator 1310 or the like. The audio output unit 1340 may output an audio stored in the storage unit 1350 under the control of the controller 1360. The audio output unit 1340 may include at least one from among a speaker, a headphone output terminal, and a Sony/Philips digital interface (S/PDIF) output terminal. The audio output unit 1340 may include a combination of the speaker, the headphone output terminal, and the S/PDIF output terminal.

In an embodiment, when at least a part of the text that is currently generated is changed or an error in the text is corrected, the audio output unit 1340 may output a notification sound or an effect sound under the control of the controller 1360.

In an embodiment, the storage unit 1350 may store various pieces of data, programs, or applications for driving and controlling the electronic device 100 under the control of the controller 1360. The storage unit 1350 may store signals or data input/output as the communicator 1310, the display 1320, the input unit 1330, and the audio output unit 1340 operate. The storage unit 1350 may store a control program for controlling the electronic device 100 and the controller 1360, an application that is initially provided from a maker or externally downloaded, a graphical user interface (GUI) related to the application, an object (e.g. image text, an icon, or a button) for providing the GUI, user information, a document, databases, or related pieces of data.

In an embodiment, examples of the term "storage unit" may include the storage unit 1350, a read-only memory (ROM) and a random-access memory (RAM) of the controller 1360, and a memory card (e.g., a micro secure digital (SD) card or a universal serial bus (USB) memory (not shown)) mounted on the electronic device 100. Also, examples of the storage unit 1350 may include a nonvolatile memory, a volatile memory, a hard disk drive (HDD), and a solid-state drive (SSD).

In an embodiment, examples of the storage unit 1350 may include a broadcast reception module, a channel control module, a volume control module, a communication control module, a voice recognition module, a motion recognition module, a light reception module, a display control module, an audio control module, an external input control module, a power control module, a power control module of an external device that is wirelessly (e.g., via Bluetooth) connected, a voice database (DB), and a motion DB which are not shown.

The modules and the DBs (not shown) of the storage unit 1350 may be provided as software for the electronic device 100 in order to perform a broadcast reception control function, a channel control function, a volume control function, a communication control function, a voice recognition function, a motion recognition function, a light reception control function, a display control function, an audio control function, an external input control function, a power control function, and a power control function of an external device that is wirelessly (e.g., via Bluetooth) connected.

In an embodiment, the controller 1360 controls an overall operation of the electronic device 100 and a signal exchange between elements of the electronic device 100, and processes data. When there is a user input or a condition that is preset and stored is satisfied, the controller 1360 may execute an operating system (OS) and various applications stored in the storage unit 1350.

In an embodiment, the controller 1360 may generate text based on a user input.

In an embodiment, the controller 1360 may generate the text based on a user input that is input through the input unit 1330. For example, the controller 1360 may receive information about letters and numbers constituting the text through the input unit 1330 from the user. In an embodiment, the controller 1360 may generate the text by using a word processing application (e.g., Microsoft Office Word).

In another embodiment, the controller 1360 may generate the text by retrieving text that is pre-stored. For example, the controller 1360 may generate new text by retrieving a document, an email, a text message, or the like stored in the storage unit 1350.

In another embodiment, the controller 1360 may generate the text by replying to or forwarding text received from an external electronic device. For example, the electronic device 100 may receive an email or a text message, and may newly generate the text by replying to or forwarding the received email or text message.

In another embodiment, the controller 1360 may generate the text through an input from the user while an instant messaging application, for example, an application that allows real-time chat with an external electronic device, is executed.

In another embodiment, the controller 1360 may generate the text that is posted on a micro-blog or an online community.

However, embodiments are not limited thereto, and the controller 1360 may generate the text by using various methods.

In an embodiment, the controller 1360 may receive information about a receiver. For example, when an email address of the receiver is input from the user to an email address input field, the controller 1360 may obtain information about the receiver corresponding to the email address based on the email address. For example, the controller 1360 may obtain the information about the receiver mapped to the email address and stored, for example, a receiver's name, an age, a sex, a department, and a position.

Alternatively, when a receiver phone number is input to a text message receiver input field, the controller 1360 may obtain the information about the receiver based on the input receiver phone number. For example, the controller 1360 may obtain the information about the receiver mapped to the receiver phone number and stored, for example, a receiver's name, an age, a sex, a department, and a position by searching a phone book.

Alternatively, when chat with the other party through an instant messaging application is performed, the controller 1360 may obtain the information about the receiver based on ID of the other party in the chat, that is, a message receiver.

Alternatively, the controller 1360 may obtain the information about the receiver by analyzing generated text. For example, the controller 1360 may obtain information about a user name and a position of the user located in an introduction part, an ending part, or a title of the text. For example, when the introduction part of the text includes "Dear Kim xx", the controller 1360 may determine "Dear Kim xx" located in a first paragraph of the text as the introduction part of the text. Once "Dear Kim xx" is determined to be included in the introduction part of the text, the controller 1360 may determine "Kim xx" located right behind "Dear" from among "Dear Kim xx" as a receiver. Once the receiver is determined, the controller 1360 may obtain receiver information mapped to the receiver by searching the storage unit 1350 such as a phone book or contact details.

Alternatively, when the text is input to a micro-blog or the like, the controller 1360 may determine the receiver as an unspecified person.

However, a method of obtaining the information about the receiver is not limited to the above examples.

In an embodiment, the controller 1360 may further obtain information about the user who generates or transmits the text in addition to the information about the receiver. For example, the controller 1360 may obtain the information about the user based on a user (or sender) email address input to an email address input field. Alternatively, the controller 1360 may obtain the information about the user based on a user name or a user phone number input to a text message sender input field. Alternatively, the controller 1360 may obtain the information about the user from the electronic device 100 itself. For example, the controller 1360 may obtain the information about the user from a SIM card of the electronic device 100.

Alternatively, the controller 1360 may further obtain the information about the user by analyzing the generated text. For example, the electronic device 100 may obtain information about a user name and a position of the user located in an introduction part, an ending part, or a title of the text. For example, when the ending part of the text includes "From Kang yy", the controller 1360 may determine "From Kang yy" as the ending part of the text. Once "From Kang yy" is determined to be included in the ending part of the text, the controller 1360 may determine "Kang yy" located right behind "From" from among "From Kang yy" as the user (or user name). Once the user is determined, the controller 1360 may obtain user information mapped to the user by searching the storage unit 1350 such as a phone book or contact details.

In an embodiment, the controller 1360 may change at least a part of the text based on the information about the receiver.

In an embodiment, the controller 1360 may change a language of the text based on the information about the receiver. For example, the controller 1360 may change a language of the generated text according to a language used by the receiver or a ratio of languages constituting the generated text.

In another embodiment, the controller 1360 may change a paragraph structure based on the information about the receiver. For example, the controller 1360 may check a paragraph structure of text that has been previously transmitted/received between the user and the receiver and a paragraph structure of the text that is currently generated. In an embodiment, examples of a paragraph structure of text may include a structure in which a summary, a detailed description, and a conclusion are sequentially arranged, a structure in which a detailed description and a conclusion are sequentially arranged, and a structure in which a summary and a detailed description are sequentially arranged. However, the paragraph of the text is not limited thereto. In an embodiment, the controller 1360 may determine whether a paragraph corresponds to a summary, a detailed description, or a conclusion by checking a conjunction, a word such as an adverb, or a clause included in the paragraph. For example, when the controller 1360 confirms that a word or a clause such as "Simply" or "In short" is included in a paragraph, for example, an introduction part of the paragraph, the controller 1360 may determine that the paragraph corresponds to a summary. Alternatively, when the controller 1360 confirms that a word or a clause such as "Particularly", "Specially", or "Concretely" is included in a paragraph, the controller 1360 may determine that the paragraph corresponds to a detailed description.

Alternatively, when the controller 1360 confirms that a word or a clause such as "In conclusion", "In short", or "Thus" is included in a paragraph, the electronic device 100 may determine that the paragraph corresponds to a conclusion. However, the technical scope of the present invention is not limited to the above examples.

In an embodiment, when the paragraph structure of the text that has been previously transmitted/received between the user and the receiver and the paragraph structure of the text that is currently generated are not the same, the controller 1360 may change the paragraph structure of the text that is currently generated to be the same as the paragraph structure of the text that has been previously transmitted/received between the user and the receiver. For example, when a paragraph structure of email text that has been transmitted from a user A to a receiver B is a structure in which a summary is located and then a detailed description is located and a paragraph structure of text that is currently generated is a structure in which a detailed description is located and then a summary is located, the controller 1360 may change the paragraph structure of the text that is currently generated to a structure in which a summary is located and then a detailed description is located.

In an embodiment, the controller 1360 may change a sentence structure of the text that is currently generated based on the information about the user. In an embodiment, the sentence structure may be a structure or an order in which words or clauses are arranged in one sentence. In an embodiment, the controller 1360 may check a sentence structure of the text that has been previously transmitted/received between the user and the receiver. The controller 1360 may change the sentence structure of the text according to the checked sentence structure. For example, when the text that is currently generated includes a general subject, an object, and a predicate, the controller 1360 may confirm that the sentence structure of the text that has been previously transmitted/received between the user and the receiver is a sentence structure using clauses written according to the five W's and one H sentence writing strategy. For example, when the sentence structure of the text that is currently generated is "The meeting will take place in the first conference room at 3:00 pm today", the controller 1360 may change the sentence structure to "For today's meeting, the time is 3:00 pm, and the location is the first conference room".

In an embodiment, the controller 1360 may change terms, etc. of the text that is currently generated based on the information about the receiver. For example, the controller 1360 may change words, clauses, or sentences in the text that is currently generated to words, clauses, or sentences having the same or similar meaning according to the information about the receiver. For example, when "Lots of love" is included in an ending part of the text that is currently generated and the controller 1360 confirms that "yours lovingly" is included in an ending part of the text that has been previously received from the receiver, the controller 1360 may change "Lots of love" to "yours lovingly". Alternatively, the controller 1360 may change a courtesy expression of the text that is currently generated based on the information about the receiver, for example, a position of the receiver. For example, when the receiver has a higher position or older than the user, the controller 1360 may change the text that is currently generated to a more polite expression. For example, when the text that is currently generated is "Thank you", the controller 1360 100 may change the text that is currently generated to a more polite expression such as "Thank you very much for your understanding and assistance". Alternatively, when the text that is currently generated is "Sorry to bother", the controller 1360 may change the text to a polite expression (or a generally used polite expression) such as "Excuse me".

In an embodiment, the controller 1360 may display the text that is generated so that a part that is determined to be changed is distinguished from parts that are not changed. For example, in order to distinguish a part of the text that is determined to be changed from other parts, the controller 1360 may display the text so that a color, a thickness, a size, or a shade of the part of the text that is determined to be changed is conspicuous. In an embodiment, the controller 1360 may display text to be obtained through change (or recommended text). For example, the controller 1360 may display the text to be obtained through change on a separate window around the part of the text that is determined to be changed While the present invention has been particularly shown and described with reference to embodiments thereof, the embodiments have merely been used to explain the present invention and should not be construed as limiting the scope of the present invention as defined by the claims. The embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A method of editing text of an electronic device, the method comprising:
   obtaining attribute information about one or more receivers;
   obtaining attribute information about a user;
   receiving text from the user;
   determining a social relationship between the user and the one or more receivers based on the attribute information about the one or more receivers and the attribute information about the user;
   changing at least a part of the text to text based on the determined social relationship;
   obtaining at least one portion of text that has been previously transmitted or received between the user and the receiver;
   comparing a first paragraph structure of the obtained at least one portion of text and a second paragraph structure of the text received from the user; and
   changing the second paragraph structure to be the same as the first paragraph structure, based on the comparison.

2. The method of claim 1, wherein the attribute information about the one or more receivers comprises information about a language used by the one or more receivers,
   wherein changing the at least part of the text further comprises changing the at least part of the text to text of another language according to the information about the language used by the one or more receivers.

3. The method of claim 1, further comprising:
   determining a representative language of the received text among a plurality of languages when the received text includes a plurality of texts of the plurality of languages;
   identifying at least one portion of text of at least one language, excluding a representative language, among the plurality of texts; and
   translating the identified at least one portion of text to the representative language.

4. The method of claim 1, further comprising determining the one or more receivers based on at least one from among an age, a sex, a nationality, a language, a religion, a job, a location, and a position of each of the one or more receivers.

5. The method of claim 1, before obtaining the attribute information about the one or more receivers, further comprising:
   collecting and storing at least one from among personal information, social relationship information, language habit information, matter of interest information, and preference information of the user;
   collecting and storing at least one from among personal information, social relationship information, language habit information, matter of interest information, and preference information of at least one other party with which the user has the social relationship; and
   collecting and storing conversation history information between the user and the at least one other party,
   wherein changing the at least part of the text comprises:
   finding information related to the one or more receivers from among the stored information; and
   correcting an error included in the text or changing the at least part of the text to text corresponding to the found information, based on the found information.

6. The method of claim 1, before obtaining the attribute information about the one or more receivers, further comprising:
   collecting and storing conversation history information between the user and at least one other party with which the user has the social relationship; and
   generating and storing language habit information of the user or language habit information of the at least one other party by analyzing the conversation history information,
   wherein changing the at least part of the text comprises:
   loading the language habit information corresponding to the user or language habit information of the one or more receivers from among the stored language habit information of the at least one other party; and
   changing the at least part of the text to text corresponding to the loaded language habit information.

7. The method of claim 1, before obtaining the attribute information about the one or more receivers, further comprising collecting and storing at least one from among prohibited word information corresponding to each of one or more types of social relationships, recommended conversation template information corresponding to each of the one or more types of social relationships, common sense information, and recent news information,
   wherein after obtaining the attribute information about the one or more receivers, after the obtaining of the attribute information about the user, and before the receiving of the text, the method further comprises:
   finding information corresponding to the one or more receivers from among the prohibited word information, the recommended conversation template information, the common sense information, and the recent news information; and displaying the found information.

8. The method of claim 1, before obtaining the attribute information about the one or more receivers, further comprising collecting and storing at least one from among common sense information and recent news information, wherein changing the at least part of the text comprises:
detecting a part of the text having content contradicting the common sense information or the recent news information; and
changing the detected part of the text to text corresponding to the common sense information or the recent news information.

9. The method of claim 1, wherein obtaining the attribute information about the one or more receivers comprises:
determining a representative receiver from among the one or more receivers,
wherein the changing of the at least part of the text comprises changing the at least part of the text according to information about the representative receiver.

10. An electronic device comprising at least one processor configured to:
receive text from a user;
obtain attribute information about one or more receivers;
obtain attribute information about the user;
determine a social relationship between the user and the one or more receivers based on the attribute information about the one or more receivers and the attribute information about the user;
change at least a part of the text to text based on the determined social relationship and the generated language habit information;
obtain at least one portion of text that has been previously transmitted or received between the user and the receiver based on the obtained information;
compare a first paragraph structure of the obtained at least one portion of text and a second paragraph structure of the text received from the user; and
change the second paragraph structure to be the same as the first paragraph structure, based on the comparison.

11. The electronic device of claim 10, wherein the attribute information about the one or more receivers further comprises information about a language used by the one or more receivers,
wherein the at least one processor changes the at least part of the text to text of another language according to the information about the language used by the one or more receivers.

12. The electronic device of claim 10, wherein the processor is further configured to: determine a representative language of the received text among a plurality of languages when the received text includes a plurality of texts of the plurality of languages; identify at least one portion of text of at least one language, excluding the representative language, among the plurality of texts: and translate the identified at least one portion of text to the representative language.

13. The electronic device of claim 10, wherein the at least one processor determines the one or more receivers based on at least one from among an age, a sex, a nationality, a language, a religion, a job, a location, and a position of each of the one or more receivers.

14. The electronic device of claim 10, further comprising a storage which collects and stores at least one from among personal information, social relationship information, language habit information, matter of interest information, and preference information of the user, collects and stores at least one from among personal information, social relationship information, language habit information, matter of interest information, and preference information of at least one other party with which the user has the social relationship, and collects and stores conversation history information between the user and the at least one other party,
wherein the at least one processor finds information related to the one or more receivers from among the stored information and corrects an error included in the text or changes the at least part of the text to text corresponding to the found information, based on the found information.

15. The electronic device of claim 10, further comprising a storage which collects and stores conversation history information between the user and at least one other party with which the user has the social relationship and generates and stores language habit information of the user or language habit information of the at least one other party by analyzing the conversation history information,
wherein the at least one processor loads the language habit information of the user or language habit information corresponding to the one or more receivers from among the stored language habit information of the at least one other party and changes the at least part of the text to text corresponding to the loaded language habit information.

16. The electronic device of claim 10, further comprising a storage configured to collect and store at least one from among prohibited word information corresponding to each of one or more types of social relationships, recommended conversation template information corresponding to each of the one or more types of social relationships, common sense information, and recent news information,
wherein the at least one processor finds information corresponding to the one or more receivers from among the prohibited word information, the recommended conversation template information, the common sense information, and the recent news information and controls the found information to be displayed on a display.

17. The electronic device of claim 10, further comprising a storage configured to collect and store at least one from among common sense information and recent news information,
wherein the at least one processor detects a part of the text having content contradicting the common sense information or the recent news information and changes the detected part of the text to text corresponding to the common sense information or the recent news information.

18. The electronic device of claim 10, wherein the at least one processor determines a representative receiver from among the one or more receivers and changes the at least part of the text according to information about the representative receiver.

* * * * *